May 24, 1938.   R. H. D. CHALLACOMBE   2,118,490
ROTARY BORING APPARATUS
Filed June 1, 1936   2 Sheets-Sheet 1
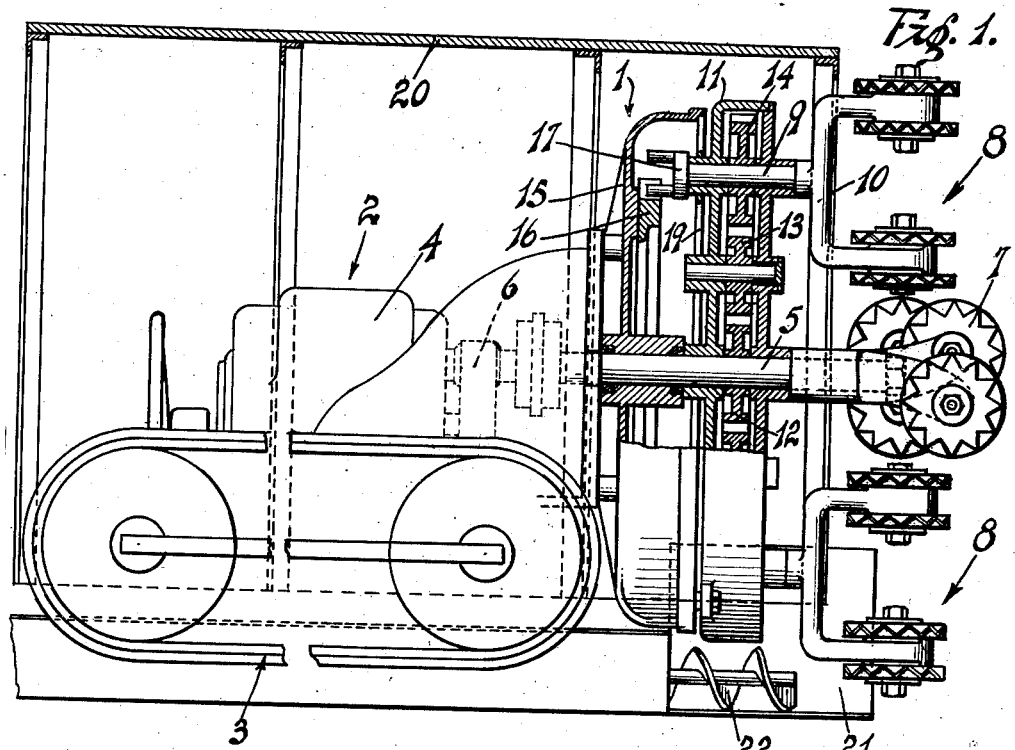
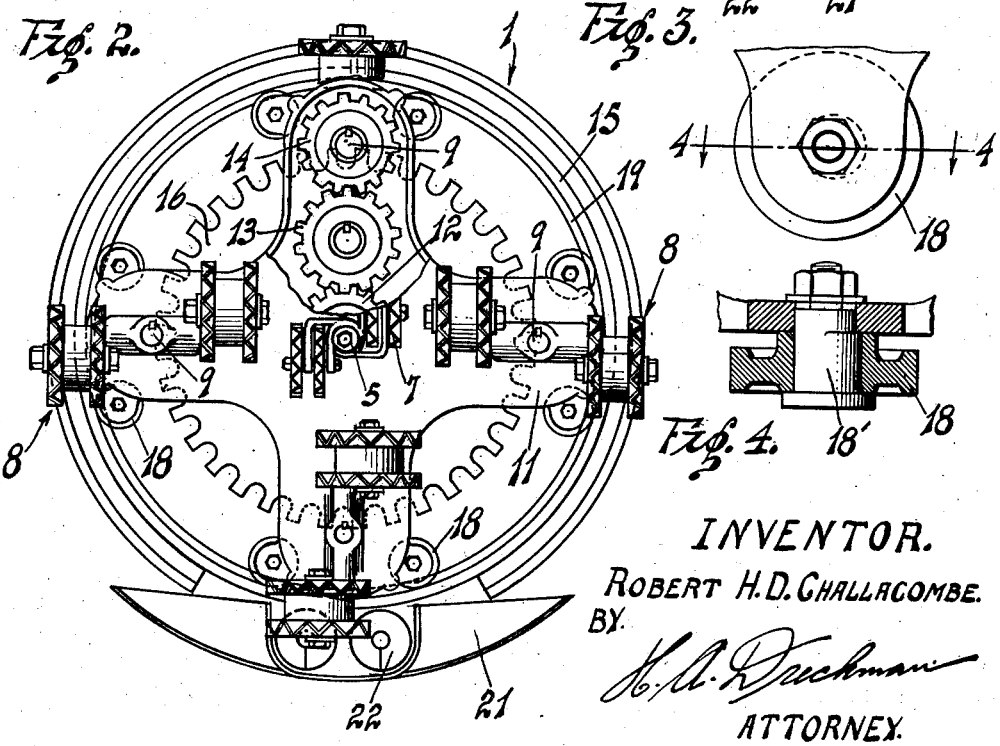
INVENTOR.
ROBERT H. D. CHALLACOMBE.
BY
ATTORNEY.

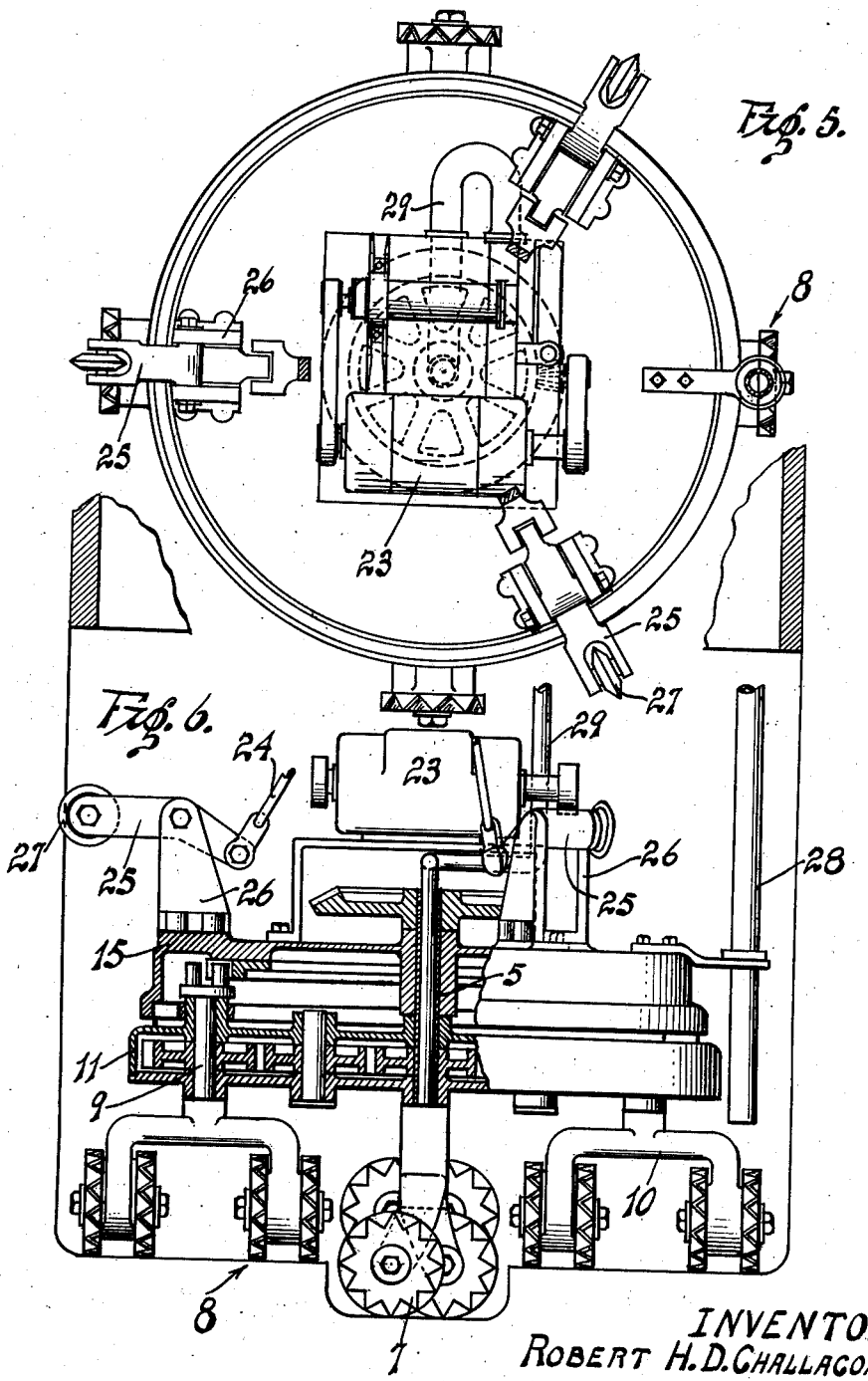

Patented May 24, 1938

2,118,490

UNITED STATES PATENT OFFICE 2,118,490

ROTARY BORING APPARATUS

Robert H. D. Challacombe, Long Beach, Calif.

Application June 1, 1936, Serial No. 82,911

13 Claims. (Cl. 262—7)

This invention relates to a rotary apparatus, particularly applicable for the cutting of tunnels, drifts, shafts, and the like thru earth, rock and similar materials.

An object of my invention is to provide a novel rotary boring apparatus which includes tools rotatable about an axis eccentric to the axis of the hole and which are also rotated about the axis of the hole so that the tools partake of a precessional movement. The tools are carried on spindles which spindles are rotated, and the speed of the spindles is substantially greater than the precessional movement of the tools.

Another object is to provide a novel rotary boring apparatus mounted upon a suitable conveying means, such as a tractor, whereby the precessional boring head is advanced along the line of the hole or tunnel. The effective diameter of boring is greater than the diameter of the head which carries the drilling or cutting tools.

Still another object is to provide an apparatus of the character stated, which will cut a bore or tunnel to a given diameter, eliminating blasting and other percussive rock loosening methods, thereby cutting a clean bore without shattering or loosening the formation.

Another feature of my invention is to cut a bore of substantial diameter with accuracy and at a greater speed than is possible under methods heretofore used.

Still another object is to provide a novel means of disposing of the detritus as the same is cut from the face of the bore or tunnel, and also to provide a novel means of supporting the wall of the bore or tunnel as the apparatus moves forwardly.

A further object is to provide a device of the character stated which is capable of cutting in either a horizontal or vertical plane, or in a plane inclined to either.

Still a further object is to provide a novel rotary boring apparatus including a plurality of precessional cutters, a central lead or pilot cutter, all of which cutters are so arranged and driven that the entire face of the bore is cut.

Other objects, advantages and features of invention may appear from the accompanying drawings, the subjoined detailed description, and the appended claims.

In the drawings:

Figure 1 is a fragmentary side elevation of my apparatus with parts broken away to show interior construction.

Figure 2 is a front elevation of the same with parts broken away to show interior construction.

Figure 3 is a fragmentary face view of one of the guide wheels on the spindle carrying the housing.

Figure 4 is a sectional view taken on line 4—4 of Fig. 3.

Figure 5 is a top plan view of a modified form of apparatus particularly applicable for cutting vertical bores.

Figure 6 is a side elevation of the apparatus as shown in Fig. 5, with parts broken away to show interior construction.

Referring more particularly to the drawings, my apparatus consists generally of a cutting and driving assembly 1 which is mounted on and driven by a mobile power means 2. As here shown, the mobile power means consists of a tractor having a tread 3 which rests on the floor of the tunnel, and by driving the tread, the apparatus is moved forwardly against the face of the tunnel.

A motor 4 serves to drive the tractor and also the rotary boring apparatus, as will be further described. This motor may be electrical or internal combustion type, depending upon conditions encountered. If desired, the cutting apparatus assembly may be adjustable relative to the tractor, and also this apparatus may be detachable from the tractor.

The drilling apparatus consists of a central drive shaft 5 which is rotated from the motor 4 by suitable gearing 6. This shaft is rotated constantly while the apparatus is working, and to the outer end thereof I affix pilot cutters 7. These pilot cutters are here shown as discs, altho other types of cutters may be used, depending upon the character of the formation thru which the tunnel is being cut. The various cutters used for different formations are usual and well known in the art of drilling.

The pilot cutters or bits are slightly in advance of the precessional cutters and their purpose is to center the apparatus and also to break up and cut the central core. The precessionary cutters 8 are mounted for rotary movement around the pilot cutters 7. I preferably provide a plurality of precessional cutters in the apparatus so that the machine is balanced and will operate smoothly and without excessive vibration. The precessional cutters are mounted on spindles 9 which spindles are eccentric to the axis of the tunnel.

The spindles 9 are eccentric to the central drive shaft 5. The cutters 8 are preferably arranged in spaced relation on a head 10. The precessional movement, in addition to the rotation of the shaft 5, causes the entire face of the tunnel to be swept by the cutters out of the area cut by the pilot cutters 7. Each of the spindles 9 is journaled in a housing 11. The housing 11, in turn, is journaled on the central shaft 5. A gear 12 is affixed to the shaft 5 and meshes with idler gears 13. The idler gears, in turn, mesh with gears 14, which last named gears are attached to the spindles 9. Thus, when the housing 11 is held so that it cannot freely rotate around the shaft 5, the spindles 9 will be rotated by the shaft 5 and thus the precessional cutters and the pilot cutters are simultaneously rotated.

The housing 11 is mounted adjacent a casing 15 which casing is fixedly attached to the tractor 2 or the non-rotating power-producing means. The shaft 5 is journaled in the casing 15 or in the forward part of the power-producing means.

A gear 16 of large diameter is fixedly attached to the casing 15 and one or more of the spindles 9 is provided with a gear 17 which meshes with the gear 16. As here shown, the gear 17 has two teeth and since the gear 16 is of large diameter, rotation of the spindles 9 will cause a slow rotation of the housing 11 around the shaft 5. Different precessional speeds can be provided by varying the gear ratio between the spindles 9, and the gear 16.

A plurality of rollers 18 are journaled on the housing 11 and travel in a track 19 in the casing 15, thereby guiding the housing adjacent its periphery and enabling said housing to rotate evenly, even tho considerable pressure or weight is applied to the cutters 8. The rollers 18 are each mounted on eccentric pins 18'. The arrangement and construction of teeth in the gears 16 and 17 can obviously be varied in a manner well known to rotate the housing 11 at the desired speed, and without having the cutters track except in a large number of revolutions.

It will be evident from the foregoing description that the cutters 8 and the precessionary movement around the pilot cutters 7—and therefore the entire face of the tunnel—will be cut as the apparatus advances. The diameter cut by the precessionary cutters 8 is greater than the diameter of the housing 11. Consequently, the apparatus will advance without hindrance as the face of the tunnel is cut away.

When cutting thru certain formations, it might be desirable to support the wall of the tunnel and for this purpose I provide a shield 20 which is mounted on the tractor 2. This shield is slightly spaced from the wall of the tunnel and therefore, by properly rotating the precessionary cutters 8, the entire apparatus can be withdrawn from the face of the tunnel thru a smaller diameter than that cut by the apparatus. The shield may be collapsible if desired or sectional for reinforcement. A reinforcement or casing may follow in the wake of the drilling in certain types of formation. Due to the mounting of the precessional cutters on the head 10, the machine can be retracted through a bore smaller in diameter than the bore than is cut by the machine.

The detritus falls to the bottom of the bore and is caught in a hopper 21 and is then conveyed to the rear of the apparatus by suitable means, such as the screw conveyor 22. Under certain conditions, water can be used, conforming to the practice common in the rotary drilling of oil wells.

In the modification shown in Figs. 5 and 6, the pilot cutters, the precessionary cutters and the gear means for driving same, are identical to those previously described.

In this latter arrangement, however, which is particularly useful in the drilling of vertical shafts, the tractor is eliminated and I have substituted a motor 23 which might be electrical. This motor is mounted on the casing 15 and the entire apparatus is supported on cables 24 when lowering and raising the same. A plurality of cables are preferably used and each cable is attached to an arm 25 which is pivotally mounted on the bracket 26, which bracket is secured to the casing 15. Each of the arms 25 carries a roller 27 which bites into the wall of the shaft, thus holding the casing 15 against rotation.

The weight of the machine is sufficient to cause the cutters to cut the bottom of the hole. When the apparatus is to be removed, the cables 24 are pulled upwardly, thus swinging the arms 25 out of engagement with the wall of the shaft. The apparatus is then removed on the cables.

The detritus is preferably removed from the hole by pumping fluid downwardly thru the pipe 28 and then pumping the detritus laden fluid out of the shaft.

My apparatus can be operated continuously without removing it from the face of the bore, the only shut-down occurring when it is necessary to replace or repair some of the cutters.

When water is used to pick up the detritus, the pump will carry the water from the face of the boring to the surface thru the pipe 29. This pipe preferably extends thru the shaft 5 and extends to adjacent the pilot cutters 7.

Having described my invention, I claim:

1. A rotary boring apparatus including a central drive shaft, drive means for said drive shaft, cutters mounted on said drive shaft, a housing journaled on the shaft, spindles journaled in said housing, drive means from the drive shaft to each of the spindles, cutters mounted on each of said spindles, a precessional drive means adapted and arranged to rotate the housing relatively slow with respect to said drive shaft.

2. A rotary boring apparatus comprising a housing, a central drive shaft journaled in the housing, a pilot cutter on said shaft, drive means for said shaft, a plurality of spindles eccentrically journaled in the housing, precessional cutters mounted on the spindles, gear drive means extending from the shaft to said spindles whereby the spindles are driven by the shaft, and precessional drive means operable by said spindles whereby the housing is rotated about the shaft.

3. A rotary boring apparatus including a housing, a central drive shaft journaled in said housing, drive means for said drive shaft, a gear fixed on the spindles, cutters mounted on the central drive shaft, cutters mounted on each of the spindles, said first named gear driving the gears on the spindles, cutters mounted on the central drive shaft, cutters mounted on each of the spindles, said housing having a rotatable movement on said drive shaft.

4. A rotary boring apparatus including a housing, a central drive shaft journaled in said housing, drive means for said drive shaft, a gear fixed on said shaft, a plurality of spindles journaled in the housing, gears fixedly attached on each of the spindles, said first named gear driving the gears on the spindles, cutters mounted on the central drive shaft, cutters mounted on each of the spindles, said housing having a rotatable movement on said drive shaft, spaced arms on the spindles, said cutters on spindles being mounted on said arms.

5. A rotary boring apparatus including a central drive shaft, drive means for said shaft, a housing, spindles journaled in the housing and spaced from the drive shaft, drive means extending from the shaft to each of the spindles, spaced arms on each of the spindles, cutters mounted on each of the arms whereby the cutters cut maximum diameter of the bore and are retractable through a bore of lesser diameter than the maximum diameter of the cut bore.

6. A rotary boring apparatus comprising a housing, a central drive shaft journaled in the housing, drive means for said shaft, a pilot cutter on said shaft, a plurality of spindles eccentrically journaled in the housing, spaced arms on each of the spindles, a precessional cutter mounted on each of the arms, gear drive means extending from the shaft to said spindles whereby the spindles are driven by the shaft, and precessional drive means operable by said spindles whereby the housing is rotated about the shaft at a speed of less than that of the shaft.

7. A rotary boring apparatus comprising a housing, a central drive shaft journaled in the housing, drive means for said shaft, a pilot cutter on the shaft, said pilot cutter being adapted and arranged to cut an appreciable portion of the bore, a plurality of spindles eccentrically journaled in the housing, precessional cutters mounted on the spindles, gear drive means extending from the shaft to the spindles whereby the spindles are driven by the shaft and precessional drive means operable by said spindles whereby the housing is rotated about the shaft.

8. A rotary boring apparatus comprising a housing, a central drive shaft journaled in the housing, a pilot cutter on said shaft, said pilot cutter being adapted and arranged to cut an appreciable portion of the bore, drive means for said shaft, a plurality of spindles eccentrically journaled in the housing, a substantially U-shaped head mounted on the spindles, precessional cutters mounted on the U-shaped head, gear drive means extending from the shaft to said spindles whereby the spindles are driven by the shaft and precessional drive means operable by said spindles whereby the housing is rotated about the shaft.

9. A rotary boring apparatus comprising a housing, a central drive shaft journaled in the housing, a pilot cutter on said shaft, said pilot cutter being adapted and arranged to cut an appreciable portion of the bore, drive means for said shaft, a plurality of spindles eccentrically journaled in the housing, a substantially U-shaped head mounted on the spindles, precessional cutters mounted on the U-shaped head, gear drive means extending from the shaft to said spindles whereby the spindles are driven by the shaft and precessional drive means operable by said spindles whereby the housing is rotated about the shaft, a shield engaging the wall of the bore, said precessional cutters being retractable through the shield.

10. A rotary boring apparatus comprising a housing, a central drive shaft journaled in the housing, a pilot cutter on said shaft, said pilot cutter consisting of radially spaced cutters, drive means for said shaft, a plurality of spindles eccentrically journaled in the housing, a substantially U-shaped head on each of the spindles, precessional cutters mounted on the head, gear drive means extending from the shaft to said spindles whereby the spindles are rotated by the shaft, a stationary precessional gear, a pinion on the spindle, said pinion meshing with the precessional gear whereby a precessional movement is imparted to said housing.

11. A rotary boring apparatus comprising a housing, a central drive shaft journaled in the housing, a pilot cutter on said shaft, drive means for said shaft, a plurality of spindles eccentrically journaled in the housing, precessional cutters mounted on the spindles, gear drive means extending from the shaft to said spindles whereby the spindles are rotated by the shaft, a stationary precessional gear, a pinion on the spindle, said pinion meshing with the precessional gear whereby a precessional movement is imparted to said housing.

12. A rotary boring apparatus comprising a conveying means, a motor on the conveying means, a casing mounted on the conveying means, a central drive shaft, said motor being adapted and arranged to drive the shaft, a housing journaled on the shaft, a plurality of spindles journaled in the housing, precessional cutters mounted on the spindles, pilot cutters mounted on the shaft, drive means from the shaft to the spindles whereby the spindles are driven from the shaft, a precessional gear, a pinion on the spindle, said pinion meshing with the precessional gear whereby a precessional movement is imparted to the housing.

13. A rotary boring apparatus comprising a conveying means, a motor on the conveying means, a casing mounted on the conveying means, a central drive shaft, said motor being adapted and arranged to drive the shaft, a housing journaled on the shaft, a plurality of spindles journaled in the housing, precessional cutters mounted on the spindles, pilot cutters mounted on the shaft, drive means from the shaft to the spindles whereby the spindles are driven from the shaft, a precessional gear, a pinion on the spindle, said pinion meshing with the precessional gear whereby a precessional movement is imparted to the housing, and guide means mounted on the housing and engaging the casing whereby the housing is supported in its rotation.

ROBERT H. D. CHALLACOMBE.